US008064755B2

(12) United States Patent
Seo et al.

(10) Patent No.: US 8,064,755 B2
(45) Date of Patent: Nov. 22, 2011

(54) METHOD AND APPARATUS FOR RECORDING A MULTI-COMPONENT STREAM AND A HIGH-DENSITY RECORDING MEDIUM HAVING A MULTI-COMPONENT STREAM RECORDED THEREON AND REPRODUCING METHOD AND APPARATUS OF SAID RECORDING MEDIUM

(75) Inventors: Kang Soo Seo, Kyunggi-do (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1179 days.

(21) Appl. No.: 10/702,518

(22) Filed: Nov. 7, 2003

(65) Prior Publication Data

US 2004/0114910 A1     Jun. 17, 2004

(30) Foreign Application Priority Data

Nov. 8, 2002   (KR) ........................ 10-2002-0069354

(51) Int. Cl.
     *H04N 5/783*      (2006.01)
(52) U.S. Cl. ....................................... 386/351; 386/344
(58) Field of Classification Search .................. 386/95, 386/124
     See application file for complete search history.

(56) References Cited

U.S. PATENT DOCUMENTS

| | | | |
|---|---|---|---|
| 5,521,898 A | 5/1996 | Ogasawara | |
| 5,559,808 A | 9/1996 | Kostreski et al. | |
| 5,602,956 A | 2/1997 | Suzuki et al. | |
| 5,651,010 A | 7/1997 | Kostreski et al. | |
| 5,729,549 A | 3/1998 | Kostreski et al. | |
| 5,732,185 A | 3/1998 | Hirayama et al. | |
| 5,742,569 A | 4/1998 | Yamamoto et al. | |
| 5,747,136 A | 5/1998 | Shono et al. | |
| 5,771,334 A | 6/1998 | Yamauchi et al. | |
| 5,784,528 A * | 7/1998 | Yamane et al. | ............... 386/112 |
| 5,819,003 A | 10/1998 | Hirayama et al. | |
| 5,835,493 A | 11/1998 | Magee et al. | |
| 5,854,873 A | 12/1998 | Mori et al. | |
| 5,870,523 A | 2/1999 | Kikuchi et al. | |
| 5,877,817 A | 3/1999 | Moon | |
| 5,884,004 A | 3/1999 | Sato et al. | |
| 5,909,257 A | 6/1999 | Ohishi et al. | |

(Continued)

FOREIGN PATENT DOCUMENTS

CN     1134583     10/1996

(Continued)

OTHER PUBLICATIONS

International Search Report, dated Feb. 26, 2004.

(Continued)

*Primary Examiner* — Allen Wong
*Assistant Examiner* — Christopher Findley
(74) *Attorney, Agent, or Firm* — Harness, Dickey & Pierce, P.L.C.

(57) ABSTRACT

The present invention records a main stream containing video contents and an auxiliary stream related therewith as logically-separated clip files on a recording medium. The logically-separated clip files, however, are interleaved on a physical recording area. Because the interleaved units of the auxiliary stream can be individually identified by a file system of the recording medium, the auxiliary stream recorded on the recording medium can be replaced with another one during reproduction or presentation.

23 Claims, 9 Drawing Sheets

U.S. PATENT DOCUMENTS

| | | | |
|---|---|---|---|
| 5,913,010 A | 6/1999 | Kaneshige et al. | |
| 5,940,255 A | 8/1999 | Uwabo et al. | |
| 5,949,792 A * | 9/1999 | Yasuda et al. | 370/474 |
| 5,953,187 A | 9/1999 | Uwabo et al. | |
| 5,987,126 A | 11/1999 | Okuyama et al. | |
| 5,999,698 A | 12/1999 | Nakai et al. | |
| 6,031,962 A | 2/2000 | Sawabe et al. | |
| 6,035,095 A * | 3/2000 | Kaneshige et al. | 386/95 |
| 6,064,796 A | 5/2000 | Nakamura et al. | |
| 6,067,400 A | 5/2000 | Saeki et al. | |
| 6,167,189 A | 12/2000 | Taira et al. | |
| 6,181,870 B1 | 1/2001 | Okada et al. | |
| 6,181,872 B1 * | 1/2001 | Yamane et al. | 386/332 |
| 6,195,726 B1 | 2/2001 | Hogan | |
| 6,219,488 B1 | 4/2001 | Mori et al. | |
| 6,222,805 B1 | 4/2001 | Mori et al. | |
| 6,285,825 B1 | 9/2001 | Miwa et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,351,442 B1 | 2/2002 | Tagawa et al. | |
| 6,353,613 B1 | 3/2002 | Kubota et al. | |
| 6,360,055 B1 | 3/2002 | Kaneshige et al. | |
| 6,377,747 B1 | 4/2002 | Murase et al. | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,393,196 B1 * | 5/2002 | Yamane et al. | 386/52 |
| 6,393,574 B1 | 5/2002 | Kashiwagi et al. | |
| 6,415,101 B1 | 7/2002 | DeCarmo et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,504,996 B1 | 1/2003 | Na et al. | |
| 6,515,101 B1 | 2/2003 | Sheares | |
| 6,546,195 B2 | 4/2003 | Kashiwagi et al. | |
| 6,556,774 B2 | 4/2003 | Tsumagari et al. | |
| 6,564,006 B1 | 5/2003 | Mori et al. | |
| 6,567,608 B2 | 5/2003 | Mori et al. | |
| 6,573,819 B1 * | 6/2003 | Oshima et al. | 386/111 |
| 6,584,277 B2 | 6/2003 | Tsumagari et al. | |
| 6,603,517 B1 * | 8/2003 | Shen et al. | 348/565 |
| 6,618,396 B1 * | 9/2003 | Mitui et al. | 370/474 |
| 6,654,543 B2 | 11/2003 | Ando et al. | |
| 6,788,883 B1 | 9/2004 | Park et al. | |
| 6,801,713 B1 | 10/2004 | Yagawa et al. | |
| 6,901,078 B2 | 5/2005 | Morris | |
| 6,904,227 B1 | 6/2005 | Yamamoto et al. | |
| 7,024,102 B1 * | 4/2006 | Inoshita et al. | 386/111 |
| 7,072,573 B2 | 7/2006 | Okada et al. | |
| 7,106,946 B1 | 9/2006 | Kato | |
| 7,124,303 B2 | 10/2006 | Candelore et al. | |
| 7,236,687 B2 | 6/2007 | Kato et al. | |
| 7,454,125 B2 * | 11/2008 | Yoo et al. | 386/241 |
| 2001/0033517 A1 * | 10/2001 | Ando et al. | 365/200 |
| 2001/0038745 A1 | 11/2001 | Sugimoto et al. | |
| 2001/0043790 A1 | 11/2001 | Saeki et al. | |
| 2001/0053280 A1 | 12/2001 | Yamauchi et al. | |
| 2002/0015383 A1 | 2/2002 | Ueno | |
| 2002/0015581 A1 | 2/2002 | Ando et al. | |
| 2002/0021761 A1 | 2/2002 | Zhang et al. | |
| 2002/0031336 A1 | 3/2002 | Okada et al. | |
| 2002/0046328 A1 | 4/2002 | Okada | |
| 2002/0076201 A1 | 6/2002 | Tsumagari et al. | |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0127002 A1 | 9/2002 | Mori et al. | |
| 2002/0145702 A1 | 10/2002 | Kato et al. | |
| 2002/0159368 A1 | 10/2002 | Noda et al. | |
| 2002/0180803 A1 | 12/2002 | Kaplan et al. | |
| 2002/0196365 A1 | 12/2002 | Cho et al. | |
| 2002/0197059 A1 | 12/2002 | Cho et al. | |
| 2003/0002194 A1 * | 1/2003 | Andoh | 360/69 |
| 2003/0026597 A1 | 2/2003 | Cho et al. | |
| 2003/0118327 A1 | 6/2003 | Um et al. | |
| 2003/0123849 A1 * | 7/2003 | Nallur et al. | 386/68 |
| 2003/0133509 A1 | 7/2003 | Yanagihara et al. | |
| 2003/0161615 A1 | 8/2003 | Tsumagari et al. | |
| 2003/0221055 A1 | 11/2003 | Okada | |
| 2003/0235403 A1 | 12/2003 | Seo et al. | |
| 2003/0235404 A1 | 12/2003 | Seo et al. | |
| 2004/0086261 A1 | 5/2004 | Hanes | |
| 2004/0156621 A1 | 8/2004 | Seo et al. | |
| 2004/0179819 A1 | 9/2004 | Cho et al. | |
| 2004/0179820 A1 | 9/2004 | Kashiwagi et al. | |
| 2004/0179827 A1 | 9/2004 | Cho et al. | |
| 2004/0247290 A1 | 12/2004 | Seo et al. | |
| 2004/0252975 A1 | 12/2004 | Cho et al. | |
| 2005/0019007 A1 * | 1/2005 | Kato et al. | 386/69 |
| 2005/0025459 A1 | 2/2005 | Kato et al. | |
| 2005/0036763 A1 | 2/2005 | Kato et al. | |
| 2006/0098936 A1 * | 5/2006 | Ikeda et al. | 386/46 |
| 2006/0222340 A1 | 10/2006 | Yamauchi et al. | |

FOREIGN PATENT DOCUMENTS

| | | |
|---|---|---|
| CN | 1150293 | 5/1997 |
| CN | 1197573 | 10/1998 |
| CN | 1220458 | 6/1999 |
| CN | 1237852 | 12/1999 |
| CN | 1251461 | 4/2000 |
| EP | 0723216 | 7/1996 |
| EP | 0737980 | 10/1996 |
| EP | 0836183 | 4/1998 |
| EP | 0836189 | 4/1998 |
| EP | 0847198 | 6/1998 |
| EP | 0873022 | 10/1998 |
| EP | 0896337 | 2/1999 |
| EP | 0917355 | 5/1999 |
| EP | 0918438 | 5/1999 |
| EP | 0920203 | 6/1999 |
| EP | 0940983 | 9/1999 |
| EP | 0 949 825 | 10/1999 |
| EP | 1 003 338 | 5/2000 |
| EP | 1 043 724 | 10/2000 |
| EP | 1081885 | 3/2001 |
| EP | 1126454 | 8/2001 |
| EP | 1198132 | 4/2002 |
| EP | 1198133 | 4/2002 |
| EP | 1202568 | 5/2002 |
| EP | 1 553 769 | 7/2005 |
| JP | 64-003781 | 1/1989 |
| JP | 01-116819 | 5/1989 |
| JP | 08-088832 | 4/1996 |
| JP | 08-235833 | 9/1996 |
| JP | 09-023403 | 1/1997 |
| JP | 09-251759 | 9/1997 |
| JP | 10-032780 | 2/1998 |
| JP | 10-040667 | 2/1998 |
| JP | 10-51737 | 2/1998 |
| JP | 10-271449 | 10/1998 |
| JP | 10-299698 | 11/1998 |
| JP | 11-041563 | 2/1999 |
| JP | 11-066813 | 3/1999 |
| JP | 11-103444 | 4/1999 |
| JP | 11-134812 | 5/1999 |
| JP | 11-185463 | 7/1999 |
| JP | 11-259976 | 9/1999 |
| JP | 11-346341 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-024973 | 1/2001 |
| JP | 2001-024985 | 1/2001 |
| JP | 2001-111944 | 1/2001 |
| JP | 2001-67802 | 3/2001 |
| JP | 2001-111929 | 4/2001 |
| JP | 2001-111960 | 4/2001 |
| JP | 2001-169246 | 6/2001 |

| | | |
|---|---|---|
| JP | 2001-297535 | 10/2001 |
| JP | 2002-083486 | 3/2002 |
| JP | 2002-112179 | 4/2002 |
| JP | 2002-150685 | 5/2002 |
| JP | 2002-158972 | 5/2002 |
| JP | 2002-158974 | 5/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 10-1999-0022858 | 10/1997 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82608 A1 * | 11/2001 |
| WO | WO 01/82609 | 11/2001 |
| WO | WO 01/82610 | 11/2001 |
| WO | WO 2004/001748 | 12/2003 |
| WO | WO 2004/001750 | 12/2003 |
| WO | WO 2004/001753 | 12/2003 |
| WO | WO 2004/045206 | 5/2004 |
| WO | WO 2004/075181 | 9/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

Chinese Office Action dated Dec. 14, 2007.
Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
Search Report for corresponding European Application No. 03761863.4 dated Mar. 25, 2008.
Office Action for corresponding Japanese Application No. 2004-517368 dated May 7, 2008.
Office Action for corresponding Japanese Application No. 2004-517390 dated May 7, 2008.
Office Action for corresponding Japanese application dated May 20, 2008.
Office Action issued Apr. 22, 2008 by the Japanese Patent Office in counterpart Japanese Patent Application No. 2006-196199.
European Patent Office Search Report dated Aug. 13, 2008 for counterpart European application.
Search Report by European Patent Office of Apr. 8, 2010 for European Application 03810715.7.
Steinmetz, R. "Multimedia File Systems Survey: Approaches for Continuous Media Disk Scheduling".
Rangan, P.V. et al. "Designing File Systems for Digital Video and Audio".
Rangan, P.V. et al "Techniques for Multimedia Synchronization in Network File Systems".
Niranja, T.N. et al, "Implementation and Evaluation of a Multimedia File System".
Search Report by European Patent Office of Apr. 8, 2010 for European Application 03810715.7.
Steinmetz, R. "Multimedia File Systems Survey : Approaches for Continuous Media Disk Scheduling" Computer Communications vol. 8, Issue 3, Mar. 1995, p. 133-144.
Rangan, P.V. et al. "Designing File Systems for Digital Video and Audio", 8283 0perating Systems Review (SIGOPS) 25 (1991) No. 5.
Rangan, P.V. et al "Techniques for Multimedia Synchronization in Network File Systems", Computer Communications 1991.
Niranja, T.N. et al. "Implementation and Evaluation of a Multimedia File System", Multimedia Computing Systems '97. Proceedings., IEEE International Conference on; pp. 269-276 (1997).

* cited by examiner

METHOD AND APPARATUS FOR RECORDING A MULTI-COMPONENT STREAM AND A HIGH-DENSITY RECORDING MEDIUM HAVING A MULTI-COMPONENT STREAM RECORDED THEREON AND REPRODUCING METHOD AND APPARATUS OF SAID RECORDING MEDIUM

BACKGROUND OF THE INVENTION

1. Field of the Invention

The present invention relates to method and apparatus for recording a multi-component stream including a main stream and an auxiliary stream, which includes additional audio or information about contents carried by the main stream, on a high-density recording medium, and further to a high-density recording medium on which a main stream and an auxiliary stream related therewith have been recorded by said method.

2. Description of the Related Art

Recently, in accordance with rapid advancement of standardization of a novel high-density rewritable optical disc such as 'Blu-ray Disc Rewritable' (called 'BD-RE') capable of recording high quality video and audio data for many hours, it is expected that related products are soon developed and released to consumer market.

The standard of BD-RE specifies that, when a main stream containing main video and its auxiliary stream containing subtitles or additional audio data of the main video is recorded on a BD-RE, a received main stream and various auxiliary streams (Aux #1-Aux #n Stream) are multiplexed by a multiplexer (MUX) in the units of an MPEG-2 transport stream packet and thus recorded and managed as a single clip file, as shown in FIG. 1. A main stream combined with or to be presented with an auxiliary stream is called a 'multi-component stream'

However, the aforementioned BD-RE standard about simultaneous recording of main and auxiliary stream that a main stream including video contents and its auxiliary stream are multiplexed in the units of a transport stream packet and recorded as a single clip file has problems that another auxiliary stream associated with a main stream cannot be added and or an original auxiliary stream combined into a main stream can not be replaced by another.

Recently, development and standardization of a high-density read-only optical disc called 'Blu-ray Disc ROM' (abbreviated 'BD-ROM') are also in progress. However, if recording of a main stream and its auxiliary stream for a BD-ROM is conducted the same as the aforementioned standard of BD-RE, an original auxiliary stream combined with a main stream can not be replaced with another during presentation although a user wants to. Therefore, an efficient recording method capable of adding or substituting an auxiliary stream associated with a main stream recorded on a BD-ROM needs to be provided immediately.

SUMMARY OF THE INVENTION

It is an object of the present invention is to provide method and apparatus for recording a multi-component data stream on a high-density recording medium in such a manner that an auxiliary stream associated with a main stream can be added or substituted later.

It is another object of the present invention is to provide a high-density recording medium on which an auxiliary stream associated with a main stream can be added or substituted while being reproduced.

It is another object of the present invention is to provide method and apparatus for reproducing a data stream recorded on a high-density recording medium on which a multi-component data stream is recorded in such a manner that an auxiliary stream can be added or substituted.

A method of recording a multi-component data stream on a recording medium in accordance with the present invention is characterized in that it records a first stream and a second stream related the first as logically-separated files while interleaving the first and the second stream on a physical recording area of the recording medium.

A method of recording a multi-component data stream on a recording medium in accordance with the present invention is further characterized in that it interleaves a first and a second stream in such a manner that size of each interleaved unit of the first and the second stream is equal to or multiples of an allocation unit defined by FAT (File Allocation Table) adopted by the recording medium.

A method of reproducing a multi-component data stream recorded on a recording medium in accordance with the present invention is characterized in that it comprises the steps of: reproducing the multi-component data stream, where a first stream and a second stream interleaved on a physical recording area of the recording medium, while reading interleaved units of only the first stream and skipping the interleaved units of the second stream, wherein the first and the second stream are recorded as logically-separated files; and making presentation of the read units of the first stream in conjunction with a third stream that is received from a device other than the recording medium.

Another method of reproducing a multi-component data stream recorded on a recording medium in accordance with the present invention is characterized in that it comprises the steps of: reproducing the multi-component data stream where a first stream and a second stream interleaved on a physical recording area of the recording medium, wherein the first and the second stream are recorded as logically-separated files; and at a jump request, moving a reproduction point on a current interleaving unit of the first stream to other target interleaving unit after reproduction of the current interleaving unit to the last.

A high-density recording medium in accordance with the present invention is characterized in that it comprises: a first stream and a second stream associated with the first stream being interleaved alternately; and a first file organized by interleaved units of the first stream and a second file organized by interleaved units of the second stream.

The high-density recording medium in accordance with the present invention is further characterized in that it further comprises a plurality of entry points, each being an information unit to indicate an arbitrary interval of the first stream of the two.

The high-density recording medium in accordance with the present invention is still further characterized in that all of the interleaved units of the first stream recorded on the recording medium are respectively covered by same number of the entry points.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

Figure 1:
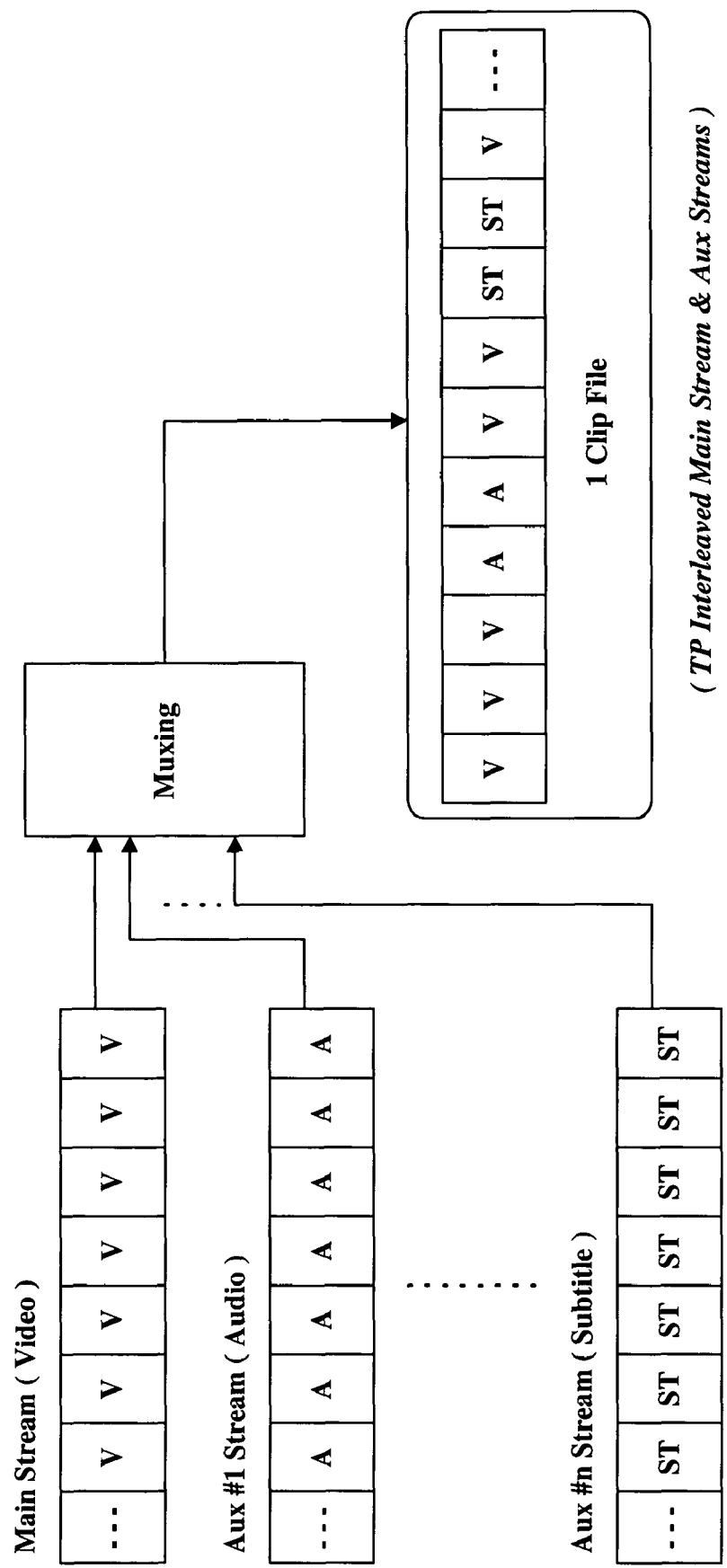
FIG. 1 is a diagram illustrating a recording example wherein a main stream and multiple auxiliary streams are recorded and managed as a single clip file.
Figure 2:
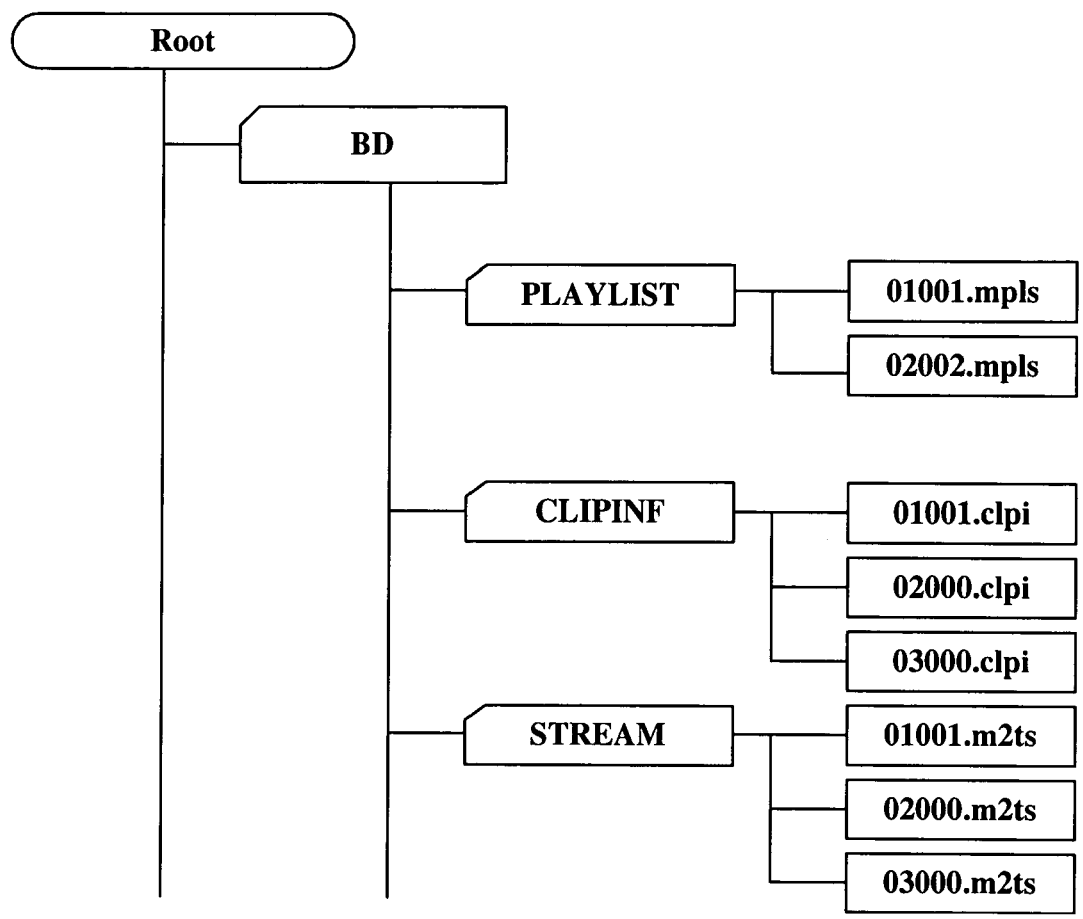
FIG. 2 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 2. Some aspects of the data structure according to the present invention shown in FIG. 2 are the same as the well-known BD-RE standard, as such these aspects will not be described in great detail.

As shown in FIG. 2, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes a main stream, e.g., MPEG2-formatted A/V stream files and auxiliary stream files of subtitle or script data that are called clips or clip files. The A/V and auxiliary stream include source packets of video, audio, subtitle, and/or script data.

For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each main (A/V) stream or auxiliary stream file. The clip information file indicates, among other things, the type of A/V stream or auxiliary stream associated therewith, sequence information, program information and timing information.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis).

Expressed another way, the playlist file identifies playitems, each playitem points to a clip or portion thereof and identifies the clip information file associated with the clip. The clip information file is used, among other things, to map the playitems to the clip of source packets.

The general files (not shown) provide general information for managing the reproduction of the A/V main streams and their auxiliary streams recorded on the optical disk.

In addition to illustrating the data structure of the recording medium according to an embodiment of the present invention, FIG. 2 represents the areas of the recording medium. For example, the general information files are recorded in one or more general information areas, the playlist directory is recorded in one or more playlist directory areas, each playlist in a playlist directory is recorded in one or more playlist areas of the recording medium, etc.

Figure 3:
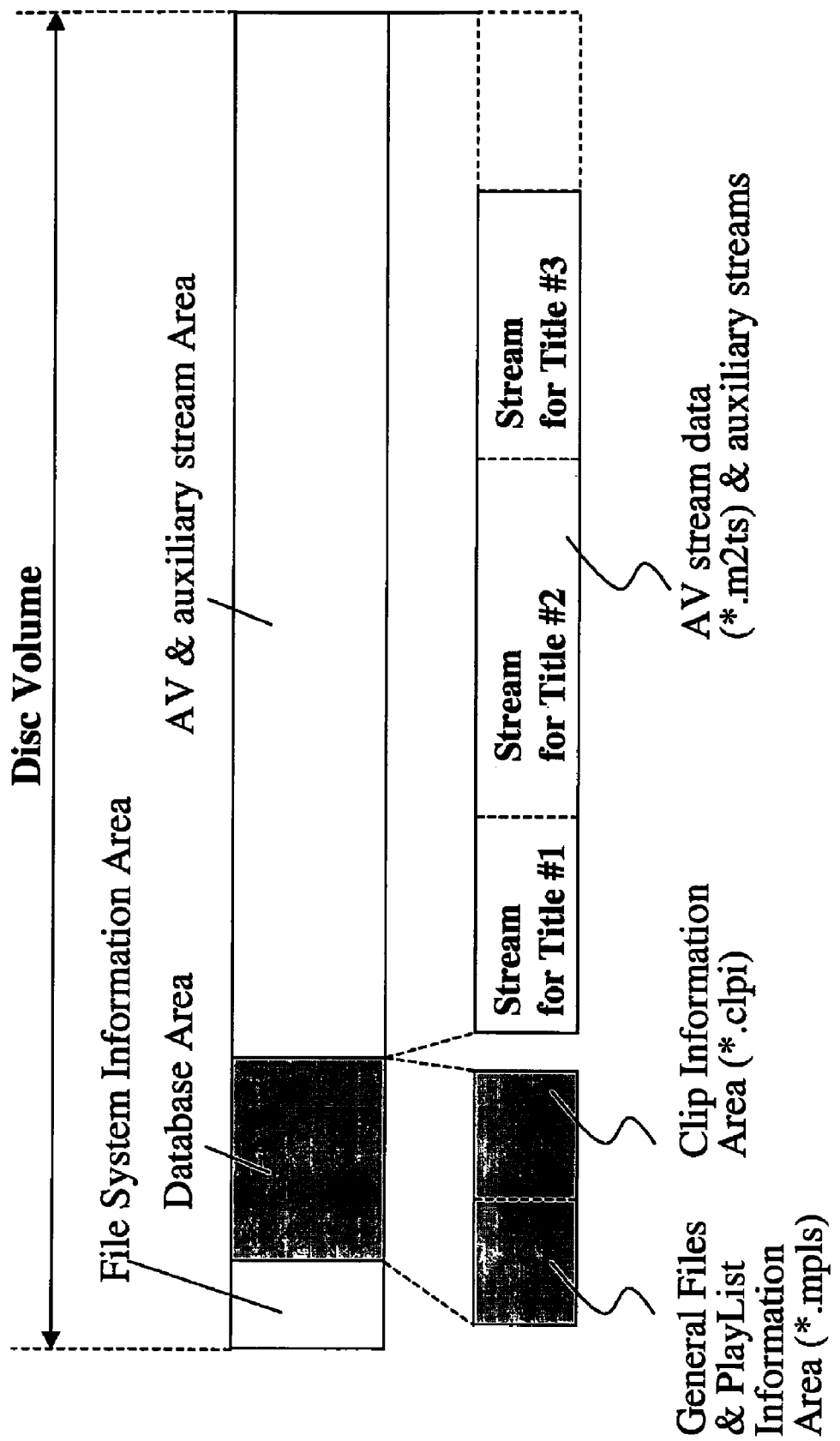
FIG. 3 illustrates an example of a recording medium having the data structure of FIG. 2 stored thereon.

FIG. 3 illustrates an example of a recording medium having the data structure of FIG. 2 stored thereon. As shown, the recording medium includes a file system information area where FAT (File Allocation Table) is recorded, a data base area and an A/V and auxiliary stream area.

The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINF directory and associated clip information files recorded therein. The A/V & auxiliary stream area has the A/V main streams and their auxiliary streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Figure 4:
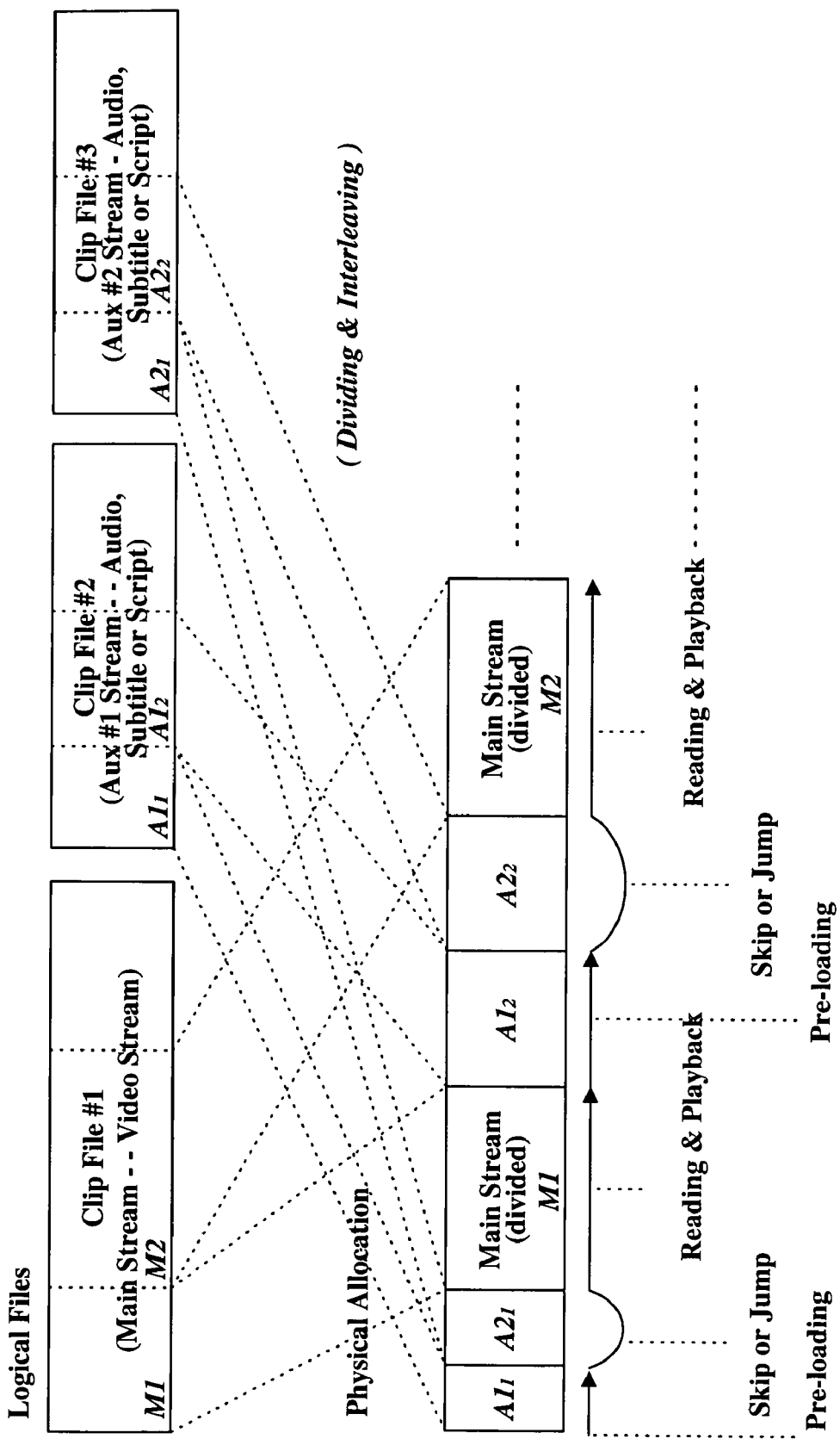
FIG. 4 is a diagram illustrating a recording embodiment wherein a main stream and auxiliary streams are interleaved and managed as logically-separated clip files in accordance with the present invention.

FIG. 4 illustrates an embodiment wherein a main stream and auxiliary streams namely, a multi-component stream pertaining to a single title is recorded in accordance with the present invention.

In the recording example, a main stream such as a video stream is recorded as the first clip file (Clip File #1); the first auxiliary stream such as audio, a subtitle, or a script describing video scenes is recorded as the second clip file (Clip File #2); and the second auxiliary stream is recorded as the third clip file (Clip File #3). The clip files are logically separated each other.

However, the three clip files (Clip File #1, #2, #3) are interleaved in a physical recording area. That is, every file is divided into a plurality of data blocks that are same or different in size, and the divided data blocks of every clip file are mixed sequentially. In illustrative FIG. 4, the leading data blocks (M1, A11, A21) of the three files are allocated in the physical recording area in order of the second, the third and the first clip file.

The size of each divided data block of a main stream and an auxiliary stream is equal to or multiples of an allocation unit defined by FAT of the recording medium.

When dividing and recording sequentially as above, the divided data block of an auxiliary stream is placed ahead of a divided main data block associated with the divided auxiliary data block. In the illustrative recording example of FIG. 4, the divided leading auxiliary data blocks (A11, A21) preceding the divided leading main data block (M1) are associated with the main data block (M1). In case of the recording example of FIG. 4, either of divided auxiliary data blocks, for example, the leading data block (A11) of the first auxiliary stream is read out and preloaded into a temporary storing means of a disk player before the associated main data block (M1) is read out; thereafter, the main data block (M1) is read and presented together with the preloaded auxiliary data block (A11) of the first auxiliary stream. In the event that only the first auxiliary stream of the second clip file (Clip File #2) is presented, the other second auxiliary stream is then skipped or jumped over.

Figure 5:
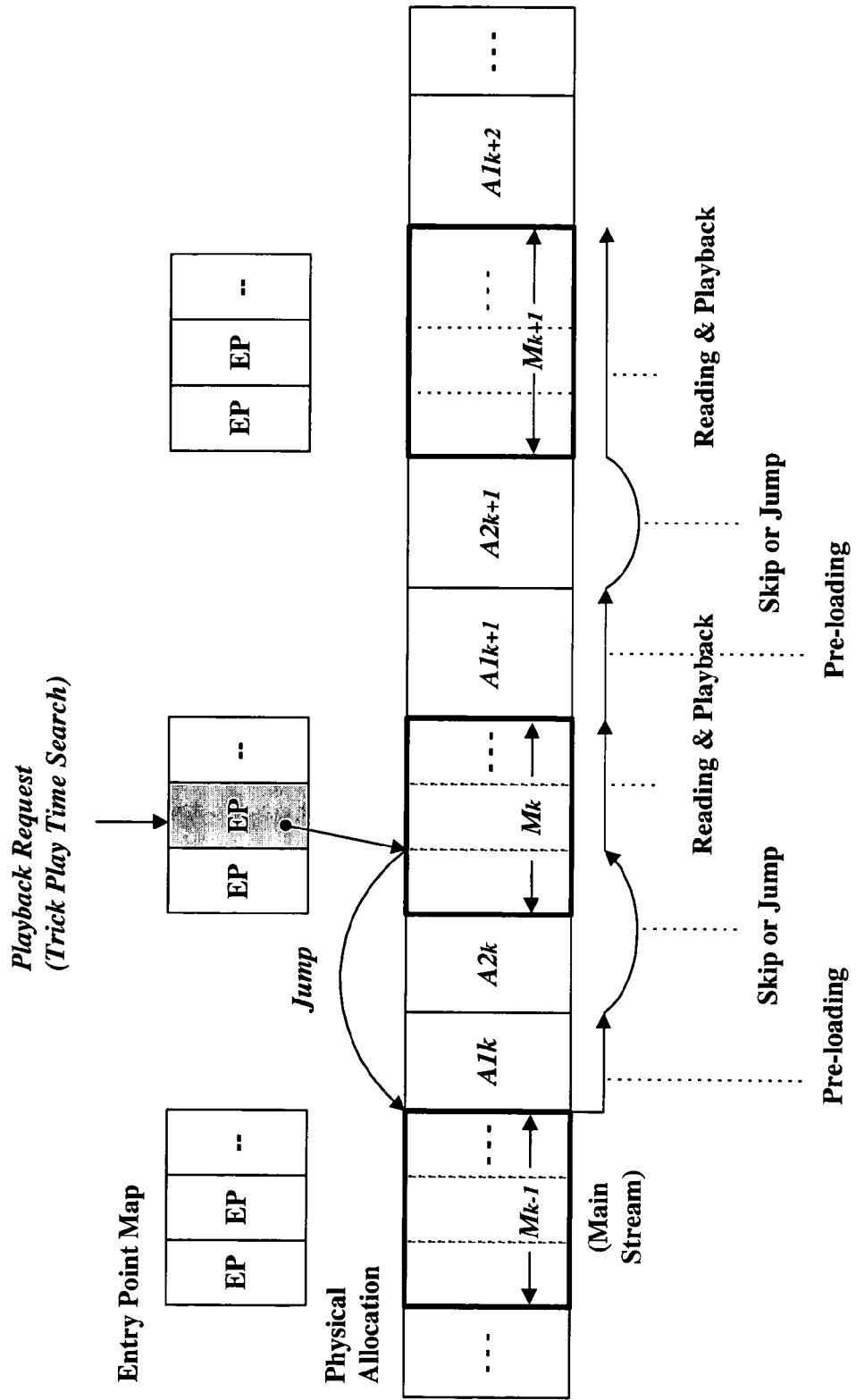
FIG. 5 is a diagram illustrating another embodiment wherein a main stream and auxiliary streams are interleaved in accordance with the present invention.

On a main stream, a divided point is at which an entry point (EP) points as shown in FIG. 5.

In case that a play request from a recording position pointed by a particular EP of the main stream is made through, e.g., trick play based on time search, a disk player first searches the interleaved stream for either, e.g., the first of the two auxiliary data blocks ($A1_k$, $A2_k$) preceding to a main data block (Mk) including the recording position and preloads the found data block ($A1_k$) into an internal memory.

The disk player then jumps again to the recording position and reads out therefrom and presents the main stream in conjunction with a related part of the preloaded auxiliary data block $A1_k$.

Figure 6:
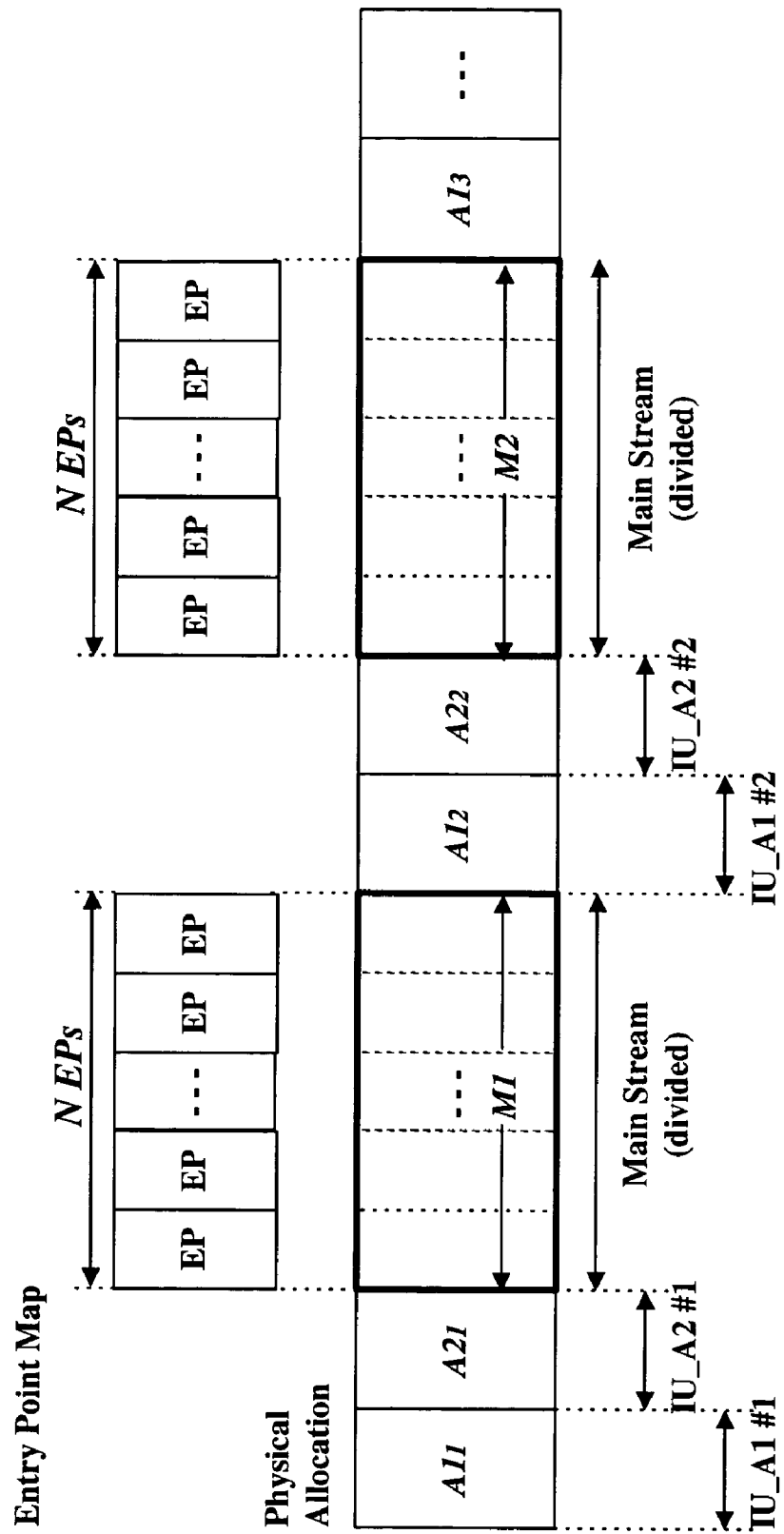
FIGS. 6 and 7 are diagrams illustrating another embodiments wherein a main stream and auxiliary streams are interleaved in accordance with the present invention.

A main stream can be divided in such a manner that each divided data block (also called 'IU' (Interleaved Unit) hereinafter) is covered by a fixed number N ($\geq 1$) of EPs, as shown in FIG. 6. Because each EP may have different time length, namely stream coverage, every IU is not same in recorded size.

Length information of each IU or the fixed number N of related EPs with a single IU is recorded in any of a clip information file for play control of the corresponding main stream clip file, or a playlist file or a playitem referring to that clip file.

The length of every IU or the fixed number N of EPs is determined so that necessary buffer size for a jump to another IU should not increase excessively, while at the same time, buffer underflow should not occur. In case that the determined length of every IU is too short or the fixed number N is too small, buffer underflow may arise during a big jump; moreover, the number of pieces of length information of all IUs to allocate and manage becomes relatively large.

On the other hand, in case that the determined length of IU is excessively long or the fixed number N is too large, buffer size for preloading an auxiliary data block increases greatly. For instance, if time length of an IU of a main stream of two-hour long is 30 minutes and its related auxiliary data block is continuous audio data at 384 kbps, then buffer size to preload the auxiliary data block at a time reaches about 86 Mbytes that is relatively large to prepare by memories.

Consequently, as mentioned above, the length of each IU or the fixed number N of EPs corresponding to a single IU is determined in consideration of the chance of buffer underflow, buffer size, and amount of length information about respective IUs.

Figure 7:
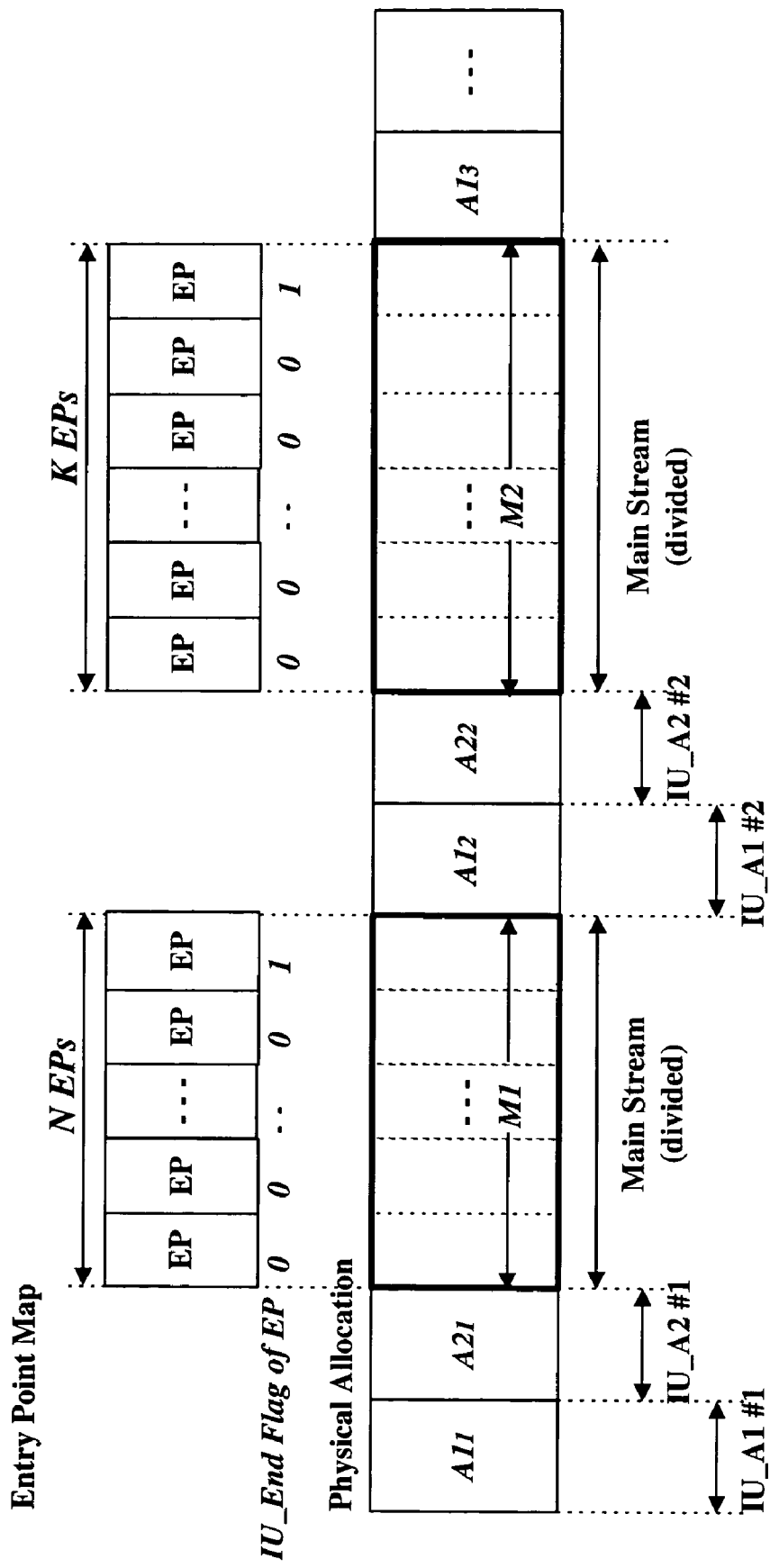

Unlike the embodiment of FIG. 6, the number of EPs corresponding to a single IU can vary as illustrated in FIG. 7. In the exemplary embodiment of FIG. 7, N EPs cover the first IU (M1) and K EPs do the second IU (M2). Furthermore, each IU can be associated with a chapter of clip file.

In the embodiment of FIG. 7, information indicative of the end of IU, e.g., an IU end flag (IU_End_Flag) included in the last EP associated with each IU is set to 'one', whereas IU end flags included in the remaining EPs are set to 'zero'.

Figure 8:
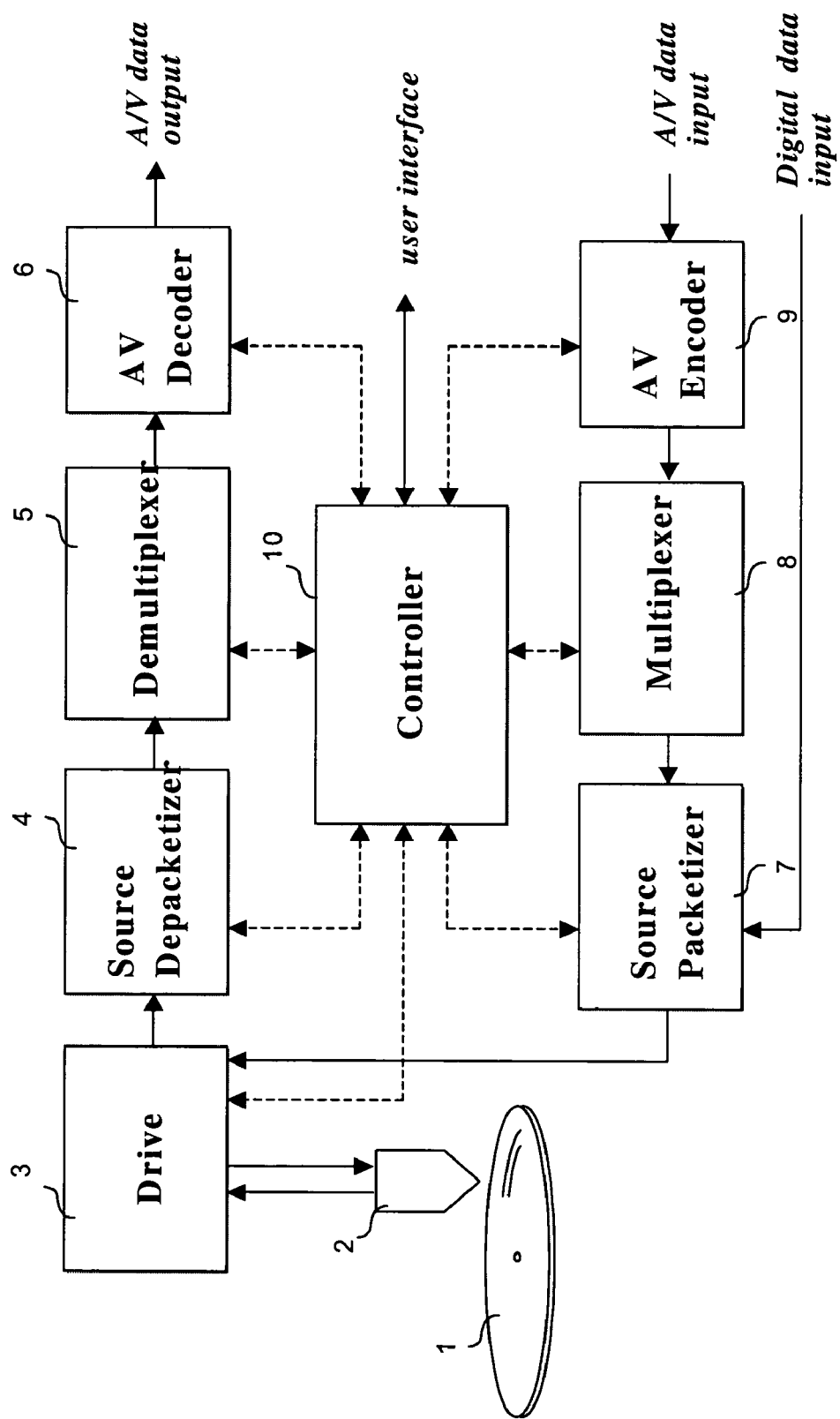
FIG. 8 illustrates a schematic diagram of an embodiment of an optical disk recording and reproduction apparatus of the present invention.

FIG. 8 illustrates a schematic diagram of an embodiment of an optical disk recording and reproducing apparatus according to the present invention. As shown, an AV encoder 9 receives and encodes data (e.g., multi-component data, A/V data, only audio data, subtitle, script language, and/or still image data). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk.

As shown in FIG. 8, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 2-7 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

For example, as discussed above with respect to the embodiments of the present invention, an auxiliary stream in a separate clip file may be reproduced in conjunction with a main stream in another clip file based on the navigation information. Furthermore, two or more auxiliary streams of respective files may be reproduced sequentially along with their main stream.

The reproduced source packets of a main and an auxiliary stream are received by a source depacketizer 4 and converted into respective data streams (e.g., MPEG-2 transport packet streams). A demultiplexer 5 demultiplexes the respective data streams into encoded data of main video and auxiliary contents such as audio, subtitle and script language. An AV decoder 6 decodes the encoded main and auxiliary data to produce the original data that was fed to the AV encoder 9.

During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source depacketizer 4. For example, the controller 10 instructs the AV decoder 9 on the type of decoding to perform, instructs the demultiplexer 5 on the transport stream to demultiplex, and instructs the source depacketizer 4 on the source packet format.

Figure 9:
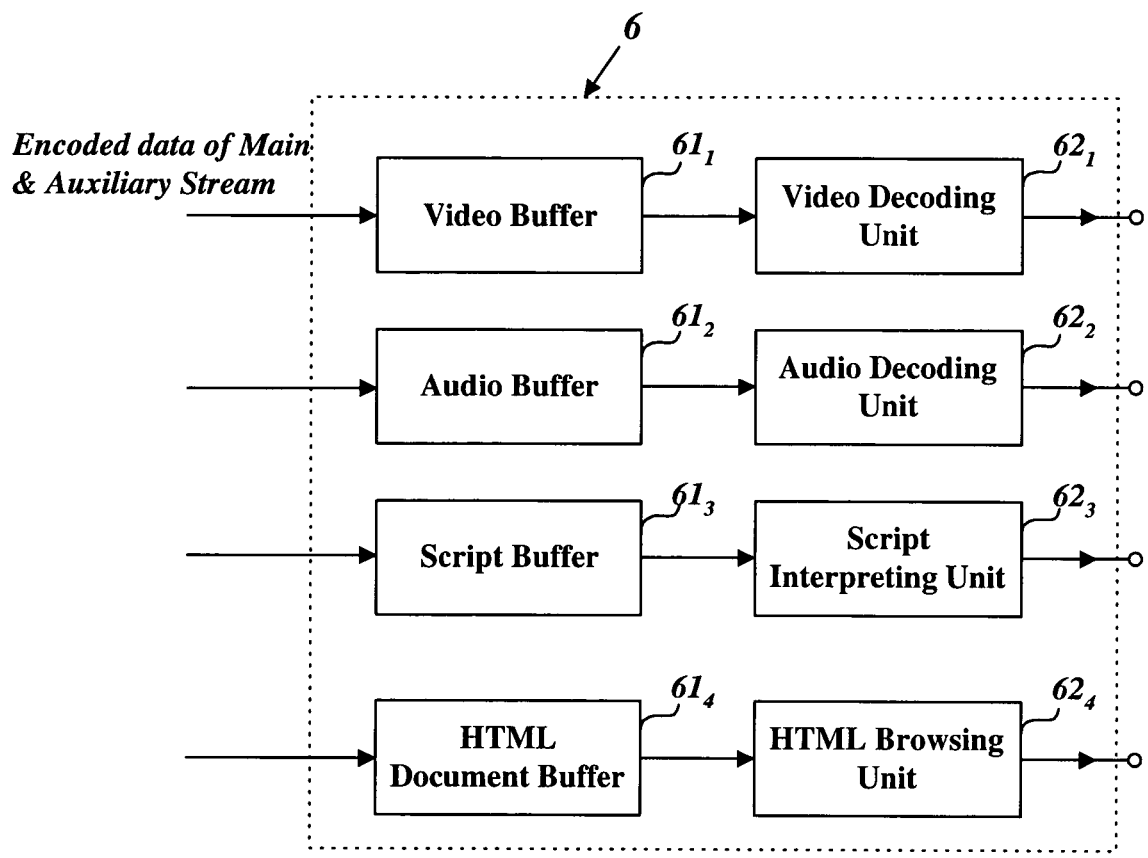
FIG. 9 shows an illustrative detailed structure of a decoder in FIG. 8.

As shown in FIG. 9, the A/V decoder 6 includes as many buffers $61_N$ as necessary to decode main and auxiliary stream data adequately, and besides video and audio decoding units $62_1$, $62_2$, it may include an adequate script interpreting unit $62_3$ for interpreting an auxiliary stream of script language and/or a browsing unit $62_4$ for processing an auxiliary stream of HTML or XML documents.

In structure of the A/V decoder 6, the demultiplexer 5 demultiplexes the inputted respective data streams into encoded data and then separates the encoded data into the pre-assigned respective buffers $61_N$.

While FIG. 8 has been described as a recording and reproducing apparatus, it will be understood that only a recording or only a reproducing apparatus may be provided using those portions of FIG. 8 providing the recording or reproducing function.

In the apparatus of FIG. 8, when a jump to another IU is requested during reproduction, the controller 10 continues to reproduce a current data block, namely IU until the last interval within the current IU whose EP has value of '1' in its IU_End_Flag is completely reproduced. After completion of reproduction of the last interval, the controller 10 conducts jump operation to a target IU. Such a jumping scheme always enables successful playback completion of a preloaded data block of auxiliary stream and a current data block of main stream regardless of jumping.

An auxiliary stream to be played in conjunction with a main stream can be obtained from outside or through a communication network such as internet. In this case, the optical disc apparatus of FIG. 8 downloads the auxiliary stream related with a main stream recorded on an optical disk into an internal memory (not shown). Afterwards, whenever a data block of the main stream is encountered, the auxiliary stream that has been downloaded or is being downloaded in the internal memory is preloaded as much as necessary for simultaneous presentation of the encountered data block. The preloaded auxiliary data block is then presented in conjunction with the corresponding main stream data block to be reproduced.

A transmitting unit of the auxiliary stream, that is downloaded at a time from a network, is pre-specified as each auxiliary data block associated with each IU of a main stream recorded on an optical disk or is determined by mutual communications between the optical disc apparatus and a server on the network.

Because an auxiliary stream is organized as a clip file separated with a main stream clip file in accordance with the present invention, data blocks of the auxiliary stream can be identified individually on the interleaved main and auxiliary stream via FAT recorded on the file system information area. Accordingly, an original auxiliary stream recorded on a recording medium can be skipped from the mixed stream by only not selecting corresponding auxiliary stream clip file, so that it can be replaced with another auxiliary stream, e.g., a stream downloaded from a network and the downloaded auxiliary stream can be presented in conjunction with a main stream recorded on the recording medium. Consequently, an original auxiliary stream on a recording medium can be replaced and a new auxiliary stream can be added.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A method of recording a plurality of data streams on a computer-readable medium, comprising:
    recording data streams including a first stream and a second stream on the computer readable medium, the first stream includes at least one jumping point, and the second stream includes at least one jumping point;
    recording clip information files including a first clip information file corresponding to the first stream and a second clip information file corresponding to the second stream on the computer readable medium, the first clip information file includes entry point information associated with the first stream, and the second clip information file includes entry point information associated with the second stream, the entry point information includes information on at least one jumping point at which jumping to another stream is permitted; and
    recording a playlist file on the computer readable medium, the playlist file identifying one or more playitems forming the playlist file, the playlist file managing the order of the playitems, the playitem for indicating in-point and out-point in at least one of the first stream and the second stream,
    wherein the first clip information file and the second clip information file are used for managing the first stream and the second stream as logically-separated files, the first stream and the second stream are divided into interleaving units and the interleaving units are interleaved on the computer-readable medium, the interleaving units include jumping points,
    wherein a size of an interleaving unit and the number of jumping points in the interleaving unit are determined to meet a buffer occupancy of a reproducing apparatus.

2. The method of claim 1, wherein the interleaving unit of the data stream is a stream section covered by $N(\geq 1)$ jumping points, each jumping point being an information unit to indicate an arbitrary interval of the data stream.

3. The method of claim 2, wherein every interleaving unit of the data stream is not covered by same number of jumping points.

4. The method of claim 1, wherein size of each interleaving unit of the first and the second stream is equal to or multiples of an allocation unit defined by FAT (File Allocation Table) of the computer-readable medium.

5. The method of claim 1, further comprising:
    identifying whether a jump operation to a target stream is available at a jump request based on the entry point information.

6. A method of reproducing a plurality of data streams recorded on a computer-readable medium, comprising:
    reproducing a playlist file from the computer readable medium, the playlist file identifying one or more playitem forming the playlist file, the playlist file managing the order of the playitems, the playitem for indicating in-point and out-point in at least one of a first stream and a second stream,
    reproducing one or more clip information files from the computer readable medium, the clip information files including at least one of a first clip information file associated with the first stream and a second clip information file associated with the second stream;
    reproducing one or more data streams from the computer readable medium based on the playlist file and the clip information files, the data streams including at least one of the first stream and the second stream, the first stream includes at least one jumping point, and the second stream includes at least one jumping point,
    wherein the first clip information file includes entry point information associated with the first stream and the second clip information file includes entry point information associated with the second stream, the entry point information includes information on at least one jumping point at which jumping to another stream is permitted, and the first clip information file and the second clip information file is used for managing the first stream and the second stream as logically-separated files, the first stream and the second stream being divided into interleaving units, the interleaving units being interleaved on the computer-readable medium, the interleaving units including jumping points, wherein a size of an interleaving unit and the number of jumping points in the interleaving unit are determined to meet a buffer occupancy of a reproducing apparatus.

7. The method of claim 6, wherein a size of each interleaving unit of the first and the second stream is equal to or multiples of an allocation unit defined by FAT (File Allocation Table) of the computer-readable medium.

8. The method of 6, further comprising:
reproducing the interleaving units of the first or second stream in conjunction with a third stream that is received from a device other than the computer-readable medium.

9. A method of reproducing a plurality of data streams recorded on a computer-readable medium, comprising:
reproducing a playlist file from the computer readable medium, the playlist file identifying one or more playitems forming the playlist file, the playlist file managing the order of the playitems, the playitem for indicating in-point and out-point in at least one of a first stream and a second stream;
reproducing one or more clip information files from the computer readable medium, the clip information files including at least one of a first clip information file associated with the first stream and a second clip information file associate with the second stream;
reproducing one or more data streams based on the playlist file and the clip information files from the computer readable medium, the data streams including at least one of the first stream and the second stream, the first stream includes at least one jumping point, and the second stream includes at least one jumping point,
wherein the first clip information file includes entry point information associated with the first stream and the second clip information file includes entry point information associated with the second stream, the entry point information including information on at least one jumping point at which jumping to another stream is permitted, and the first clip information file and the second clip stream information file being used for managing the first stream and the second stream as logically-separated files, the first stream and the second stream being divided into interleaving units, the interleaving units being interleaved on the computer-readable medium, the interleaving units including jumping points; and
at a jump request, moving a reproduction point on a current interleaving unit of a current stream to a target interleaving unit of another stream at the jumping point,
wherein a size of an interleaving unit and the number of jumping points in the interleaving unit are determined to meet a buffer occupancy of a reproducing apparatus.

10. The method of claim 9, wherein each of the interleaving units of the data stream is a stream section covered by at least one jumping point, each jumping point being an information unit to indicate an arbitrary interval of the data stream.

11. A computer-readable medium storing a computer executable program to manage recording or reproducing data streams, comprising:
data streams including a first stream and a second stream, the first stream and the second stream being divided into interleaving units, the interleaving units being interleaved alternately on the computer-readable medium, the first stream including at least one jumping point, and the second stream including at least one jumping point, the interleaving units including jumping points; and
clip information files including a first clip information file associated with the first stream and a second clip information file associated with the second stream, the first clip information file including entry point information associated with the first stream and the second clip information file including entry point information associated with the second stream, the entry point information including information of at least one jumping point at which jumping to another stream is permitted, the first clip information file and the second clip information file being used for managing the first stream and the second stream as logically-separated files; and
a playlist file identifying one or more playitems forming the playlist file, the playlist file managing the order of the playitems, the playitem for indicating in-point and out-point in at least one of the first stream and the second stream,
wherein a size of an interleaving unit and the number of jumping points in the interleaving unit are determined to meet a buffer occupancy of a reproducing apparatus.

12. The computer-readable medium of claim 11, wherein each of the interleaving units of the data stream is a stream section covered by at least one jumping point.

13. The computer-readable medium of claim 12, wherein all of the interleaving units of the data stream are respectively covered by same number of jumping points.

14. The computer-readable medium of claim 11, wherein a size of each interleaving unit of the first and the second stream is equal to or multiples of an allocation unit defined by FAT (File Allocation Table) of the computer-readable medium.

15. An apparatus for recording a plurality of data streams on a computer-readable medium, comprising:
a recording unit configured to record data on the computer-readable medium; and
a controller, operatively coupled to the recording unit, configured to control the recording unit to record data streams on the computer readable medium, the data streams including a first stream and a second stream, the first stream and the second stream being divided into interleaving units, the interleaving units being interleaved on the computer-readable medium, the first stream includes at least one jumping point, and the second stream includes at least one jumping point, the interleaving units including jumping points, and
the controller configured to control the recording unit to record clip information files on the computer readable medium, the clip information files including a first clip information file associated with the first stream and a second clip information file associated with the second stream, the first clip information file including entry point information associated with the first stream and the second clip information file including entry point information associated with the second stream, the first clip information file and the second clip information file being used for managing the first stream and the second stream as logically-separated files, the entry point information includes information on at least one jumping point at which jumping to another stream is permitted; and
the controller configured to control the recording unit to record a playlist file on the computer readable medium, the playlist file identifying one or more playitems forming the playlist file, the playlist file managing the order of the playitems, the playitem for indicating in-point and out-point in at least one of the first stream and the second stream, wherein a size of an interleaving unit and the number of jumping points in the interleaving unit are determined to meet a buffer occupancy of a reproducing apparatus.

16. The apparatus of claim 15, wherein an interleaving unit of the data stream is a stream section covered by at least one jumping point, each jumping point being an information unit to indicate an arbitrary interval of the data stream.

17. The apparatus of claim 15, wherein the recording unit includes a pickup configured to record the data on the computer readable medium.

18. An apparatus for reproducing a plurality of data streams recorded on a computer-readable medium, comprising:
   a reproducing unit configured to reproduce data recorded on the computer-readable medium; and
   a controller, operatively coupled to the reproducing unit, configured to control the reproducing unit to read a playlist file from the computer readable medium, the playlist file identifying one or more playitems forming the playlist file, the playlist file managing the order of the playitems, the playitem for indicating in-point and out-point in at least one of a first stream and a second stream;
   the controller configured to control the reproducing unit to read one or more clip information files from the computer readable medium, the clip information files including at least one of a first clip information file associated with the first stream and a second clip information file associated with the second stream; and
   the controller configured to control the reproducing unit to reproduce one or more data streams based on the playlist file and the clip information files from the computer readable medium, the data streams including at least one of the first stream and the second stream, the first stream includes at least one jumping point, and the second stream includes at least one jumping point, the first clip information file including entry point information associated with the first stream and the second clip information file including entry point information associated with the second stream, the entry point information including information on at least one jumping point at which jumping to another stream is permitted, the first clip information file and the second clip information file being used for managing the first stream and the second stream as logically-separated files, the first stream and the second stream being divided into interleaving units, the interleaving units being interleaved on the computer-readable medium, the interleaving units including jumping points,
   wherein a size of an interleaving unit and the number of jumping points in the interleaving unit are determined to meet a buffer occupancy of a reproducing apparatus.

19. The apparatus of claim 18, wherein an interleaving unit of the data stream is a stream section covered by at least one jumping point, each jumping point being an information unit to indicate an arbitrary interval of the data stream.

20. The apparatus of claim 18, wherein the recording unit includes a pickup configured to record the data on the computer readable medium.

21. An apparatus for reproducing a plurality of data streams recorded on a computer-readable medium, comprising:
   a reproducing unit configured to reproduce data recorded on the computer-readable medium; and
   a controller, operatively coupled to the reproducing unit, configured to control the reproducing unit to read a playlist file from the computer readable medium, the playlist file identifying one or more playitems forming the playlist file, the playlist file managing the order of the playitems, the playitem for indicating in-point and out-point in at least one of a first stream and a second stream;
   the controller configured to control the reproducing unit to read one or more clip information files from the computer readable medium, the clip information files including at least one of a first clip information file associated with the first stream and a second clip information file associated with the second stream;
   the controller configured to control the optical reproducing unit to reproduce one or more data streams based on the playlist file and the clip information files from the computer readable medium, the data streams including at least one of the first stream and the second stream, the first stream includes at least one jumping point, and the second stream includes at least one jumping point, the first clip information file including entry point information associated with the first stream and the second clip information file including entry point information associated with the second stream, the entry point information including information on at least one jumping point at which jumping to another stream is permitted, and the first clip information file and the second clip information file being used for managing the first stream and the second stream as logically-separated files, the first stream and the second stream being divided into interleaving units, the interleaving units being interleaved on the computer-readable medium, the interleaving units including jumping points; and
   the controller further configured to, at a jump request during the reproduction, move a reproduction point on a current interleaving unit of a current stream to a target interleaving unit of another stream at the jumping point,
   wherein a size of an interleaving unit and the number of jumping points in the interleaving unit are determined to meet a buffer occupancy of a reproducing apparatus.

22. The apparatus of claim 21, wherein an interleaving unit of the data stream is a stream section covered by at least one jumping point, each jumping point being an information unit to indicate an arbitrary interval of the data stream.

23. The apparatus of claim 21, wherein the reproducing unit includes a pickup configured to reproduce the data from the computer readable medium.

* * * * *